US011288507B2

United States Patent
Hirai et al.

(10) Patent No.: US 11,288,507 B2
(45) Date of Patent: Mar. 29, 2022

(54) OBJECT DETECTION IN IMAGE BASED ON STOCHASTIC OPTIMIZATION

(71) Applicant: SONY CORPORATION, Tokyo (JP)

(72) Inventors: Michiro Hirai, Tokyo (JP); Nobutaka Mitsuma, Tokyo (JP); Nikolaos Georgis, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 178 days.

(21) Appl. No.: 16/585,538

(22) Filed: Sep. 27, 2019

(65) Prior Publication Data

US 2021/0097277 A1   Apr. 1, 2021

(51) Int. Cl.
  *G06K 9/00*  (2006.01)
  *G06K 9/32*  (2006.01)
  *G06N 3/08*  (2006.01)

(52) U.S. Cl.
  CPC ....... *G06K 9/00624* (2013.01); *G06K 9/3258* (2013.01); *G06N 3/08* (2013.01); *G06K 2209/15* (2013.01)

(58) Field of Classification Search
None
See application file for complete search history.

(56) References Cited

U.S. PATENT DOCUMENTS

| | | | |
|---|---|---|---|
| 9,760,789 B2 | 9/2017 | Burry et al. | |
| 11,049,014 B2* | 6/2021 | Suzuki | G06K 9/6262 |
| 2013/0243308 A1* | 9/2013 | Wang | G06T 7/11 |
| | | | 382/159 |
| 2015/0248586 A1* | 9/2015 | Gaidon | G06K 9/00711 |
| | | | 382/103 |
| 2017/0124409 A1* | 5/2017 | Choi | G06N 3/0454 |
| 2018/0122082 A1* | 5/2018 | Mukherjee | G06N 3/0454 |
| 2020/0072610 A1* | 3/2020 | Hofmann | G06N 3/0454 |
| 2020/0073399 A1* | 3/2020 | Tateno | G05D 1/0274 |

(Continued)

FOREIGN PATENT DOCUMENTS

CN   101408933 A   4/2009

OTHER PUBLICATIONS

Wang M, Luo C, Hong R, Tang J, Feng J. Beyond object proposals: Random crop pooling for multi-label image recognition. IEEE Transactions on Image Processing. Sep. 22, 2016;25(12):5678-88. (Year: 2016).*

(Continued)

*Primary Examiner* — Michelle M Entezari
(74) *Attorney, Agent, or Firm* — Chip Law Group

(57) ABSTRACT

An electronic device includes circuitry that determines probability map information for a first image, based on application of a neural network model on the first image. The neural network model is trained to detect one or more objects based on a plurality of images associated with the one or more objects. The probability map information indicates a probability value for each pixel in the first image. A region corresponding to the one or more objects is detected in the first image based on the probability map information. A first set of sub-images is determined from the detected region, based on application of a stochastic optimization function on the probability map information. The one or more objects are detected from a second set of sub-images of the first set of sub-images, based on application of the neural network model on the second set of sub-images.

18 Claims, 5 Drawing Sheets

(56) References Cited

U.S. PATENT DOCUMENTS

2020/0294220 A1* 9/2020 Gonzalez Diaz .... G06Q 10/087
2020/0349464 A1* 11/2020 Lin ...................... G06K 9/6273

OTHER PUBLICATIONS

Rodriguez-Serrano JA, Larlus D, Dai Z. Data-driven detection of prominent objects. IEEE transactions on pattern analysis and machine intelligence. Dec. 17, 2015;38(10):1969-82. (Year: 2015).*
Naveen Balaji Gowthaman, "Smart Vehicle Number Plate Detection System for Different Countries Using an Improved Segmentation Method", Imperial Journal of Interdisciplinary Research (IJIR), vol. 03, No. 06, Jun. 2017, pp. 263-268.

* cited by examiner

OBJECT DETECTION IN IMAGE BASED ON STOCHASTIC OPTIMIZATION

CROSS-REFERENCE TO RELATED APPLICATIONS/INCORPORATION BY REFERENCE

None.

FIELD

Various embodiments of the disclosure relate to an object detection in an image. More specifically, various embodiments of the disclosure relate to an object detection in image based on stochastic optimization.

BACKGROUND

With the advancements in a field of image processing, various techniques for detection of objects present in images have been developed. The detection of objects from the images may be used for various purposes. For example, license plates of vehicles may be detected from the images of road traffic, for surveillance and traffic regulation. In certain situations of high definition (HD) images, the accurate detection of objects may be a computationally challenging task which further may be inefficient. In certain other situations, the size of the images is reduced to fasten the object detection tasks. However, in such situations, the accuracy of the object detection from the reduced-size images may also reduce. Thus, an intelligent system may be required which may enhance the accuracy of object detection in an efficient manner.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An apparatus and a method for detection of an object in an image based on stochastic optimization, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
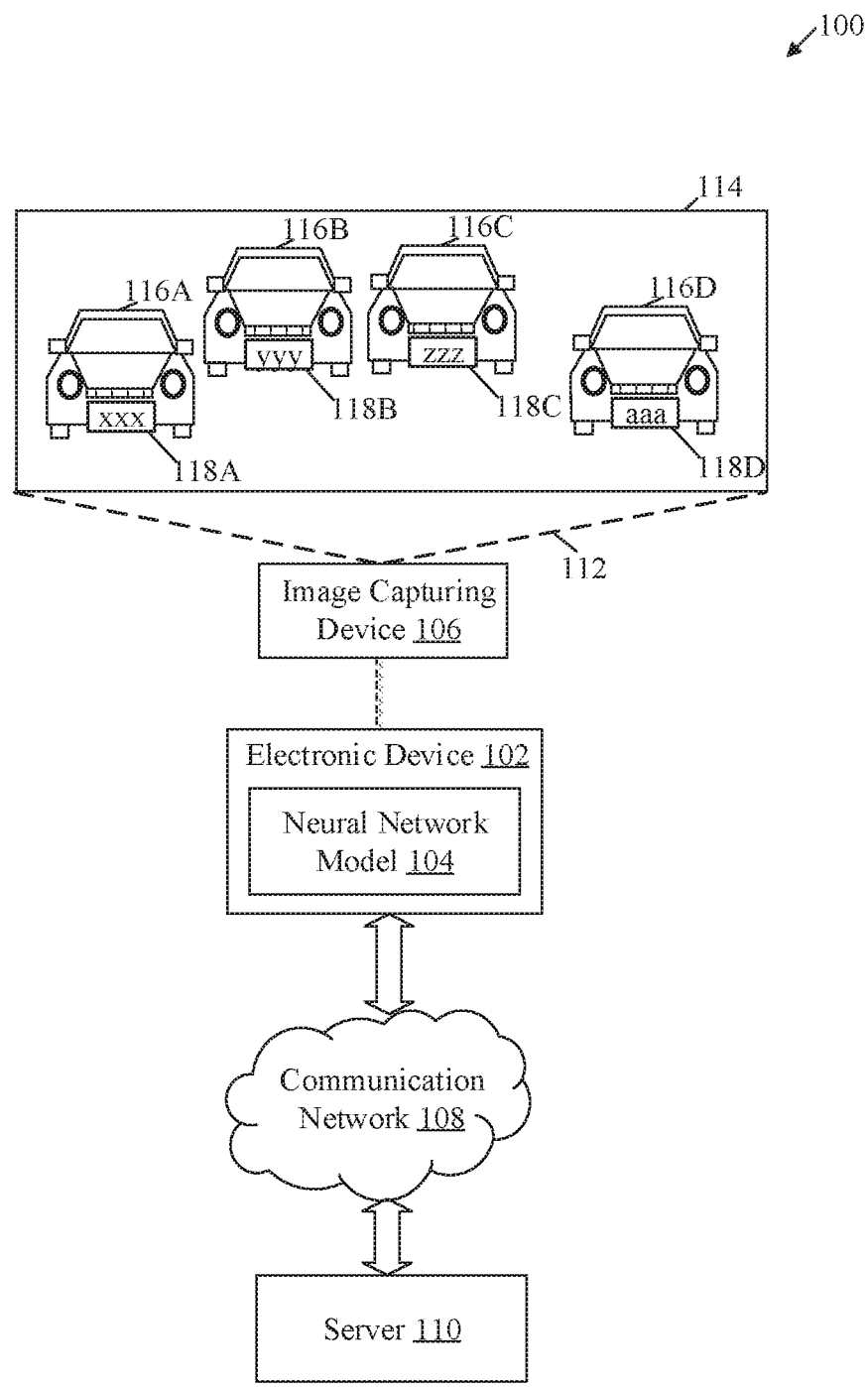
FIG. 1 is a block diagram that illustrates an exemplary environment for detection of an object in an image based on stochastic optimization, in accordance with an embodiment of the disclosure.

Various embodiments of the present disclosure may be found in an electronic device and a method for accurate and efficient detection of an object present in an image based on stochastic optimization. The electronic device may be configured to determine probability map information for an image (for example a high-definition (HD) image), based on application of a neural network model on the image. The neural network model may be pre-trained to detect one or more objects based on a plurality of images (i.e. training dataset) associated with the one or more objects. The probability map information may indicate a probability value for each pixel which may be associated with or may include a portion of the one or more objects captured in the original image. The electronic device may be further configured to detect a region (or an area of interest) that may correspond to the one or more objects in the image based on the determined probability map information of the image. The disclosed electronic device may further determine a first set of sub-images (for example a set of to be cropped images) from the detected region, based on application of a stochastic optimization function on the determined probability map information. The size of each of the first set of sub-images may be lesser than the size of the image. Further, the electronic device may detect the one or more objects (for example license plate of a vehicle) from a second set of sub-images (i.e. a batch of the set of cropped images) of the first set of sub-images, based on application of the neural network model on the second set of sub-images.

The disclosed electronic device may detect the one or more objects (such license plates) from the image (for example HD image) based on the second set of sub-images which may be selected from the first set of sub-images (i.e. which may be lesser in size than actual size of the image (i.e. HD image)). The disclosed electronic device may further input the selected second set of sub-images in batches to the pre-trained neural network model for detection of the one or more objects. Since the size of the sub-images, input in the batches to the neural network model, is lesser than that of the actual image (i.e. HD image), the complexity for the object detection may be reduced. Further, the first set of sub-images may be determined from the region that may include pixels that may have a higher probability (i.e. the probability map information) of association with the one or more objects to be detected. Thus, the disclosed electronic device may process only the pixels (in the region) which may have the higher probability of inclusion or association with the objects and may not process other pixels (with lower probability) to finally achieve an efficient objection detection. Therefore, the selection of sub-images (i.e. having higher probability of inclusion of the objects) from the actual image (HD image), without re-sizing (i.e. reduction in size) the actual image, may further enhance or maintain the accuracy of the object detection by the disclosed electronic device 102.

FIG. 1 is a block diagram that illustrates an exemplary environment for detection of an object in an image based on stochastic optimization, in accordance with an embodiment of the disclosure. With reference to FIG. 1, there is shown a network environment 100 comprising an electronic device 102, an image capturing device 106, a communication network 108, and a server 110. The electronic device 102 may further include a neural network model 104. In some embodiments, the electronic device 102 may be communicatively coupled to the image capturing device 106. In some embodiments, the image capturing device 106 may be integrated with the electronic device 102. The electronic device 102 may be communicatively coupled to the server 110, via the communication network 108. In FIG. 1, there is also shown a field-of-view 112 of the image capturing device 106 and a first image 114 that may be captured by the image capturing device 106 based on the field-of-view 112 of the image capturing device 106. The first image 114 may include a plurality of objects 116A-116D (collectively referred herein as the plurality of objects 116). The plurality of objects 116 may include a first object 116A, a second object 116B, a third object 116C, and a fourth object 116D. For example, each object from the plurality of objects 116 may correspond to a vehicle. Further, each object from the plurality of objects 116 may include a vehicle license plate of a respective vehicle such as, a first vehicle license plate 118A, a second vehicle license plate 118B, a third vehicle license plate 118C, and a fourth vehicle license plate 118D.

It may be noted that the vehicles 116A-116D and vehicle license plates 118A-118D shown in FIG. 1 are presented merely as examples of the plurality of objects 116. The present disclosure may be also applicable to other types of objects such as human faces, humans, animals, other animate or inanimate objects. A description of other types of objects has been omitted from the disclosure for the sake of brevity. It may be further noted here that the position, orientation, arrangement, and/or shape of the plurality of objects 116 shown in FIG. 1 is presented merely as an example. The present disclosure may be also applicable to other positions, orientations, arrangements, and/or shapes of the plurality of objects 116, without deviation from the scope of the disclosure. The four number of objects in the plurality of objects 116 shown in FIG. 1 is also presented merely as an example. The plurality of objects 116 may include a N number of objects which may be lesser or greater than four for the purpose of the disclosure, without deviation from the scope of the disclosure.

The electronic device 102 may include suitable logic, circuitry, interfaces, and/or code that may be configured to detect one or more objects in an image (for example the first image 114). For the detection of the plurality of objects 116, the electronic device 102 may be configured to apply the neural network model 104 on the first image 114 and determine probability map information for the first image 114. The probability map information may indicate a probability value for each pixel associated with the plurality of objects 116 in the first image 114. Further, the electronic device 102 may be configured to detect a region that corresponds to the plurality of objects 116 in the first image 114 based on the determined probability map information of the first image 114. The electronic device 102 may be configured to determine a first set of sub-images from the detected region, based on application of a stochastic optimization function on the determined probability map information and further detect the plurality of objects 116 from a second set of sub-images of the first set of sub-images, based on application of the neural network model 104 on the second set of sub-images. Examples of the electronic device 102 may include, but are not limited to a vehicle tracker device, an Automatic License Plate Recognition (ALPR) device, an in-vehicle embedded device, an electronic control unit (ECU), a handheld computer, a cellular/mobile phone, a tablet computing device, a Personal Computer (PC), a mainframe machine, a server, and other computing devices.

In one or more embodiments, the neural network model 104 may include electronic data, such as, for example, a software program, code of the software program, libraries, applications, scripts, or other logic or instructions for execution by a processing device, such as a processor of the electronic device 102. The neural network model 104 may include code and routines configured to enable a computing device, such as the processor of the electronic device 102, to perform one or more operations. The one or more operations may include classification of each pixel of an image (e.g., the first image 114) into one of a true description or a false description associated with the plurality of objects 116. Additionally or alternatively, the neural network model 104 may be implemented using hardware including a processor, a microprocessor (e.g., to perform or control performance of one or more operations), a field-programmable gate array (FPGA), or an application-specific integrated circuit (ASIC). In some other instances, the neural network model 104 may be implemented using a combination of hardware and software. Examples of the neural network model 104 may include, but are not limited to, an artificial neural network (ANN), a convolutional neural network (CNN), a CNN-recurrent neural network (CNN-RNN), Region-CNN (R-CNN), Fast R-CNN, Faster R-CNN, a Long Short Term Memory (LSTM) network based RNN, a combination of CNN and ANN, a combination of LSTM and ANN, a gated recurrent unit (GRU)-based RNN, a deep Bayesian neural network, a Generative Adversarial Network (GAN), a deep learning based object detection model, a feature-based object detection model, an image segmentation based object detection model, a blob analysis-based object detection model, a "you look only once" (YOLO) object detection model, or a single-shot multi-box detector (SSD) based object detection model. In some embodiments, the neural network model 104 may conduct numerical computation techniques using data flow graphs. In certain embodiments, the neural network model 104 may be based on a hybrid architecture of multiple Deep Neural Networks (DNNs).

The image capturing device 106 may include suitable logic, circuitry, interfaces, and/or code that may be configured to capture one or more image frames, such as, the first image 114 based on the field of view 112 of the image capturing device 106. Examples of the first image 114 may include High Dynamic Range (HDR) images, High Definition (HD) image, 4K resolution image (such as 3840×2160 resolution image, 4096×2160 resolution image, 7680×4320 resolution image), or a HD RAW image. In some embodiments, the first image 114 may be an image frame of video content captured by the image capturing device 106. The image capturing device 106 may be configured to communicate the captured image frames (e.g., the first image 114) as input to the electronic device 102. The image capturing device 106 may be implemented by use of a charge-coupled device (CCD) technology or complementary metal-oxide-semiconductor (CMOS) technology. Examples of the image capturing device 106 may include, but are not limited to, an image sensor, a wide-angle camera, an HD camera, a front camera, a driving camera, a 360 degree camera, a closed circuitry television (CCTV) camera, a stationary camera, an action-cam, a video camera, a camcorder, a digital camera, a camera phone, a time-of-flight camera (ToF camera), a night-vision camera, and/or other image capture devices. The image capturing device 106 may be implemented as an integrated unit of the electronic device 102 or as a separate device (e.g., a camera device mounted on the electronic device 102).

The communication network 108 may include a medium through which the electronic device 102 may communicate with the server 110. In some embodiments, the electronic device 102 may communicate with the image capturing device 106 via the communication network 108. Examples of the communication network 108 may include, but are not limited to, the Internet, a cloud network, a Long Term Evolution (LTE) network, a Wireless Local Area Network (WLAN), a Local Area Network (LAN), a telephone line (POTS), or other wired or wireless network. Various devices in the network environment 100 may be configured to connect to the communication network 108, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, or Bluetooth (BT) communication protocols, or a combination thereof.

The server 110 may include suitable logic, circuitry, interfaces, and/or code that may be configured to train one or more neural network models, for example, recurrent neural network (RNN), such as Long Short Term Memory networks (LSTM) networks, CNN, deep neural network, or an artificial neural network that may be a combination of the ANN and CNN networks. For example, a first neural network model may be trained for vehicle region detection from a plurality of images, and a second network model may be trained for license plate region detection from the detected vehicle region included in the plurality of images. The server 110 may be configured to deploy the trained model(s) on the electronic device 102 for real time or near real time vehicles and license plates detection and/or recognition. In some embodiments, the server 110 may be configured to store the capture first image 114 and the plurality of objects 116 (or the license plates) detected from the first image 114. Examples of the server 110 may include, but are not limited to, an application server, a cloud server, a web server, a database server, a file server, a mainframe server, or a combination thereof.

In operation, the server 110 may be configured to train the neural network model 104 for detection of an object from an image (for example the first image 114). The neural network model 104 may be pre-trained based on a plurality of images that may include one or more objects. The server 110 may transmit the trained neural network model 104 to the electronic device 102 and deploy the trained neural network model 104 on the electronic device 102. The electronic device 102 may be configured to store the received neural network model 104 in a memory (e.g., a memory 206 of FIG. 2) of the electronic device 102, and apply the trained neural network model for object detection from images. Examples of the neural network model 104 may include, but are not limited to, an artificial neural network (ANN), a convolutional neural network (CNN), a CNN-recurrent neural network (CNN-RNN), Region-CNN (R-CNN), Fast R-CNN, Faster R-CNN, a Long Short Term Memory (LSTM) network based RNN, a combination of CNN and ANN, a combination of LSTM and ANN, a gated recurrent unit (GRU)-based RNN, a deep Bayesian neural network, a Generative Adversarial Network (GAN), a deep learning based object detection model, a feature-based object detection model, an image segmentation based object detection model, a blob analysis-based object detection model, a "you look only once" (YOLO) object detection model, or a single-shot multi-box detector (SSD) based object detection model.

In accordance with an embodiment, the electronic device 102 may be configured to control the image capturing device 106 to capture a sequence of image frames (that may include a plurality of different vehicles) in the field-of-view 112 of the image capturing device 106. In one example, the sequence of image frames may be a live video (e.g., a video including the first image 114) of a road portion that may include the plurality of different vehicles, such as, the first object 116A or the second object 116B. Examples of the first object 116A or the second object 116B (as vehicles) may include, but is not limited to, a car, a motorcycle, a truck, a bus, or other vehicles with license plates. In some embodiments, the electronic device 102 may control the image capturing device 106 to capture the first image 114. The first image 114 may include, for example, the High Dynamic Range (HDR) image, High Definition (HD) image, or 4K resolution image.

In accordance with an embodiment, the electronic device 102 may be further configured to detect one or more bounding boxes in the first image 114 based on the application of the neural network model 104 on the first image 114. Each of the one or more bounding boxes may include the plurality of objects 116 included in the first image 114. The detection of the one or more bounding boxes in the first image 114 are described, for example, in FIG. 3A. The electronic device 102 may be further configured to determine probability map information for the first image 114, based on application of the neural network model 104 on the first image 114 or based on the detected one or more bounding boxes in the first image 114. The probability map information may indicate a probability value for each pixel associated with the plurality of objects 116 in the first image 114. In some embodiments, the probability map information may indicate a presence or absence of a portion of an object from the plurality of objects 116 at each pixel in the first image 114. The probability map information is described, for example, in FIG. 3A.

Figure 3A:
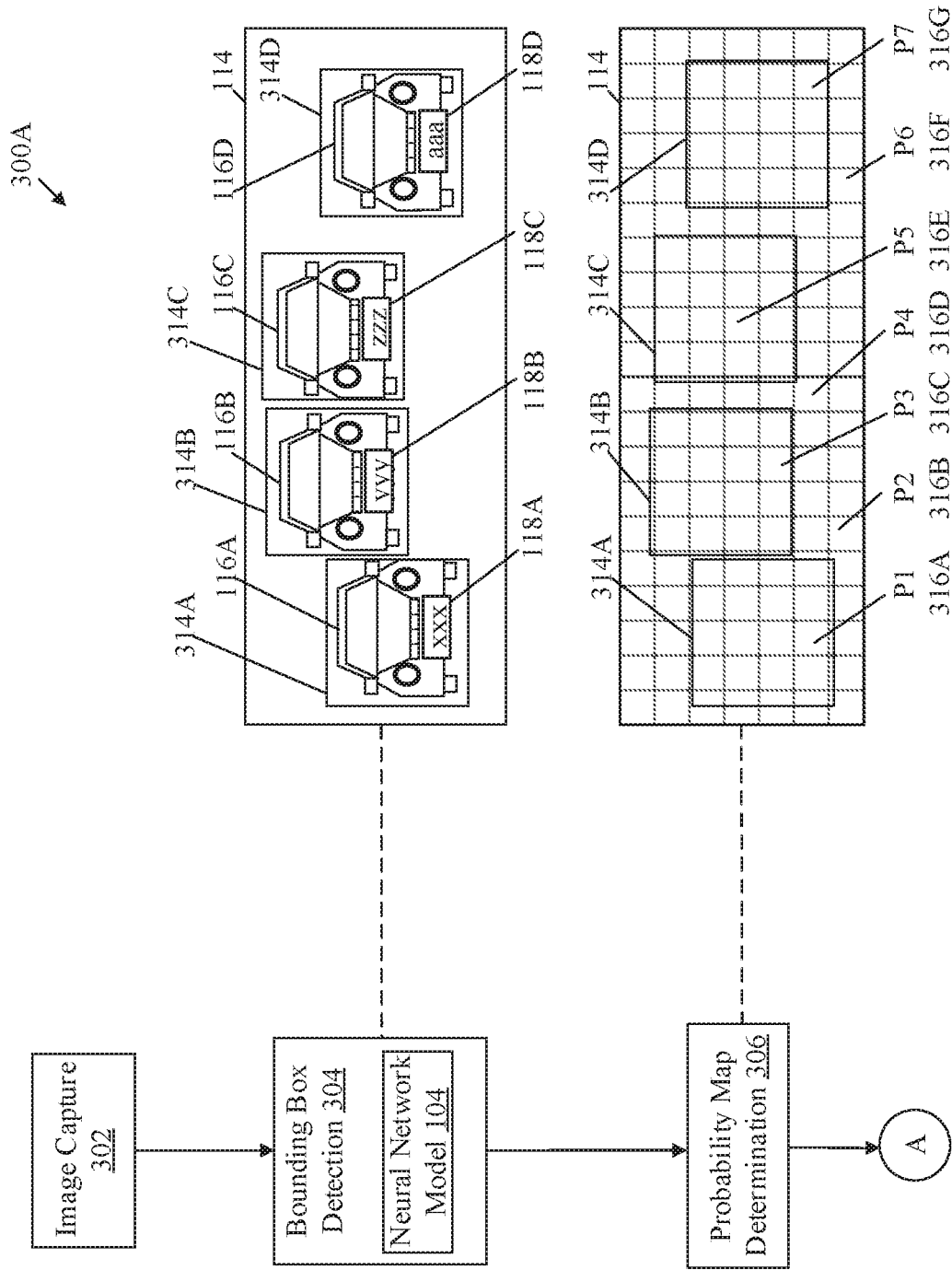
FIGS. 3A and 3B are diagrams that collectively illustrate an exemplary scenario for detection of an object in an image based on stochastic optimization, in accordance with an embodiment of the disclosure.

The electronic device 102 may be further configured to detect the region that corresponds to the plurality of objects 116 in the first image 114 based on the determined probability map information of the first image 114 as described, for example, in FIG. 3A. The electronic device 102 may further determine a first set of sub-images from the detected region, based on application of a stochastic optimization function on the determined probability map information. The first set of sub-images may be cropped images from the first image 114. Therefore, the size of each of the first set of sub-images may be lesser than the size of the first image 114. Examples of the stochastic optimization function include, but are not limited to, a cost function, a direct search function, a simultaneous perturbation function, a Hill climbing function, a random search function, a Tabu search function, a Particle Swarm Optimization (PSO) function, an Ant Colony Optimization function, a simulated annealing function, or a genetic function. Further, the electronic device 102 may be configured to detect the plurality of objects 116 from a second set of sub-images of the first set of sub-images, based on application of the neural network model 104 on the second set of sub-images. The second set of sub-images may be selected from the first set of sub-images in batches. The number of second set of sub-images selected in batches from the first set of sub-images may be predefined or stored in the memory 206. The detection of the plurality of objects 116 from the second set of sub-images is described, for example, in FIG. 3B.

Figure 2:
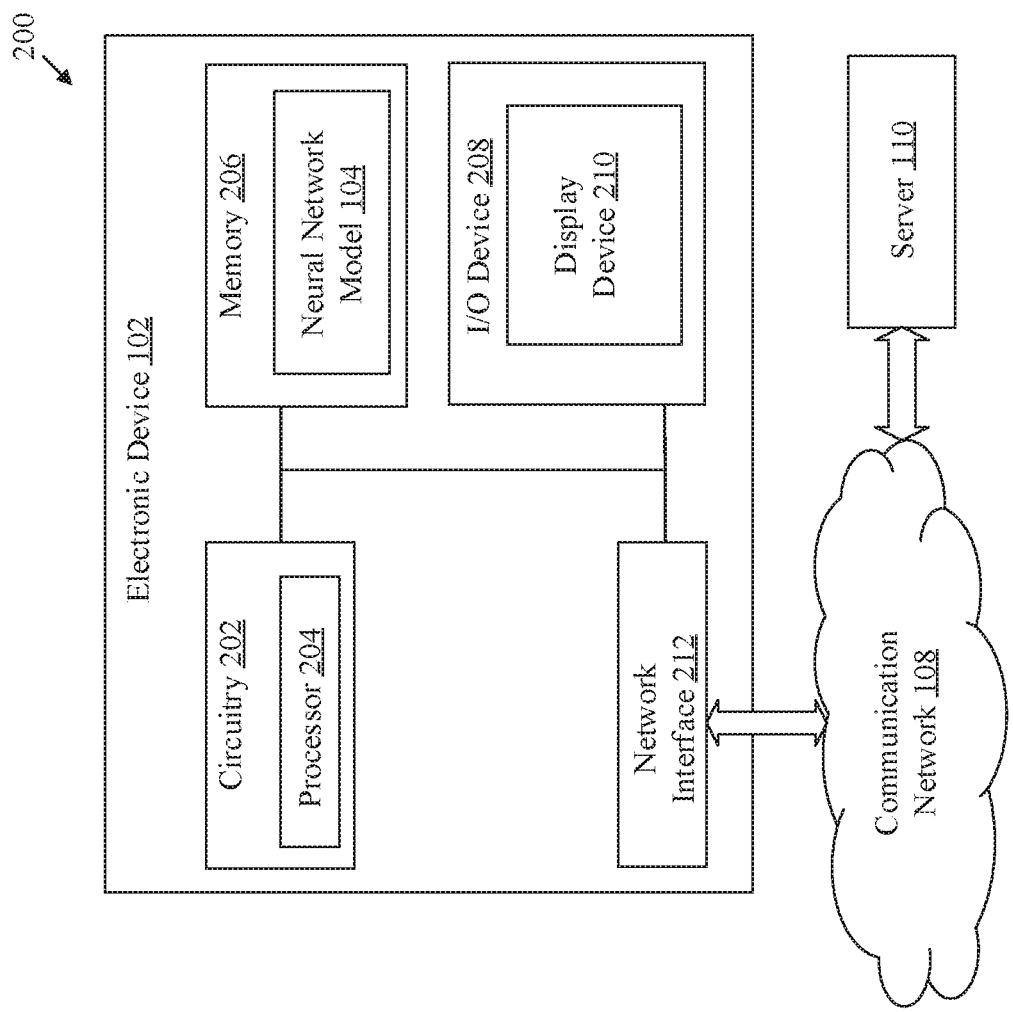
FIG. 2 is a block diagram that illustrates an exemplary electronic device for detection of an object in an image based on stochastic optimization, in accordance with an embodiment of the disclosure.

FIG. 2 is a detailed block diagram that illustrates an electronic device for detection of an object in an image based on stochastic optimization, in accordance with an embodiment of the disclosure. FIG. 2 is explained in conjunction with elements from FIG. 1. With reference to FIG. 2, there is shown a block diagram 200 that depicts an electronic device, such as, the electronic device 102. The electronic device 102 may include circuitry 202 that comprises one or more processors, such as, a processor 204. The electronic device 102 may further include a memory 206, an input/output (I/O) device 208, and a network interface 212. The memory 206 may include the neural network model 104. Further, the I/O device 208 of the electronic device 102 may include a display device 210. The network interface 212 may communicatively couple the electronic device 102 with the communication network 108, to connect the electronic device 102 with the server 110.

The circuitry 202 may comprise suitable logic, circuitry, interfaces, and/or code that may be configured to execute a set of instructions stored in the memory 206. The circuitry 202 may be configured to execute the set of instructions associated with different operations to be executed by the electronic device 102. For example, some of the operations may include determination of the probability map information for the first image 114 based on application of the neural network model 104 on the first image 114, detection of the region based on the determined probability map information of the first image 114, determination of the first set of sub-images from the detected region, and detection of the plurality of objects 116 from the second set of sub-images of the first set of sub-images, based on application of the neural network model 104 on the second set of sub-images. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The processor 204 may comprise suitable logic, circuitry, and interfaces that may be configured to execute instructions stored in the memory 206. In certain scenarios, the processor 204 may be configured to execute the aforementioned operations of the circuitry 202. The processor 204 may be implemented based on a number of processor technologies known in the art. Examples of the processor 204 may be a Central Processing Unit (CPU), X86-based processor, a Reduced Instruction Set Computing (RISC) processor, an Application-Specific Integrated Circuit (ASIC) processor, a Complex Instruction Set Computing (CISC) processor, a Graphical Processing Unit (GPU), other processors, or a combination thereof.

The memory 206 may comprise suitable logic, circuitry, interfaces, and/or code that may be operable to store a set of instructions executable by the circuitry 202 or the processor 204. The memory 206 may be configured to store a sequence of image frames (e.g., the first image 114) captured by the image capturing device 106. The memory 206 may be configured to store the neural network model 104 that may be pre-trained to detect the plurality of objects 116 from an image (such as the first image 114). Examples of implementation of the memory 206 may include, but are not limited to, Random Access Memory (RAM), Read Only Memory (ROM), Hard Disk Drive (HDD), and/or a Secure Digital (SD) card.

The I/O device 208 may comprise suitable logic, circuitry, interfaces, and/or code that may be configured to receive an input and provide an output based on the received input. The I/O device 208 may include various input and output devices, which may be configured to communicate with the circuitry 202. Examples of the I/O device 208 may include, but are not limited to, a touch screen, a keyboard, a mouse, a joystick, a display device (for example, the display device 210), a microphone, and a speaker. The display device 210 may comprise suitable logic, circuitry, and interfaces that may be configured to display an output of the electronic device 102. The display device 210 may be configured to display identification information (for example name or detected vehicle plate number) of the detected plurality of objects 116 in the first image 114. In some embodiments, the display device 210 may be an external display device associated with the electronic device 102. The display device 210 may be a touch screen which may enable a user to provide a user-input via the display device 210. The touch screen may be at least one of a resistive touch screen, a capacitive touch screen, or a thermal touch screen. The display device 210 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 210 may refer to a display screen of a head mounted device (HMD), a smart-glass device, a see-through display, a projection-based display, an electro-chromic display, or a transparent display.

The network interface 212 may comprise suitable logic, circuitry, interfaces, and/or code that may be configured to enable communication between the electronic device 102, and the server 110 via the communication network 108. The network interface 212 may implement known technologies to support wired or wireless communication with the communication network 108. The network interface 212 may include, but is not limited to, an antenna, a frequency modulation (FM) transceiver, a radio frequency (RF) transceiver, one or more amplifiers, a tuner, one or more oscillators, a digital signal processor, a coder-decoder (CODEC) chipset, a subscriber identity module (SIM) card, and/or a local buffer. The network interface 212 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Long Term Evolution (LTE), Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.120g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

Figure 3B:
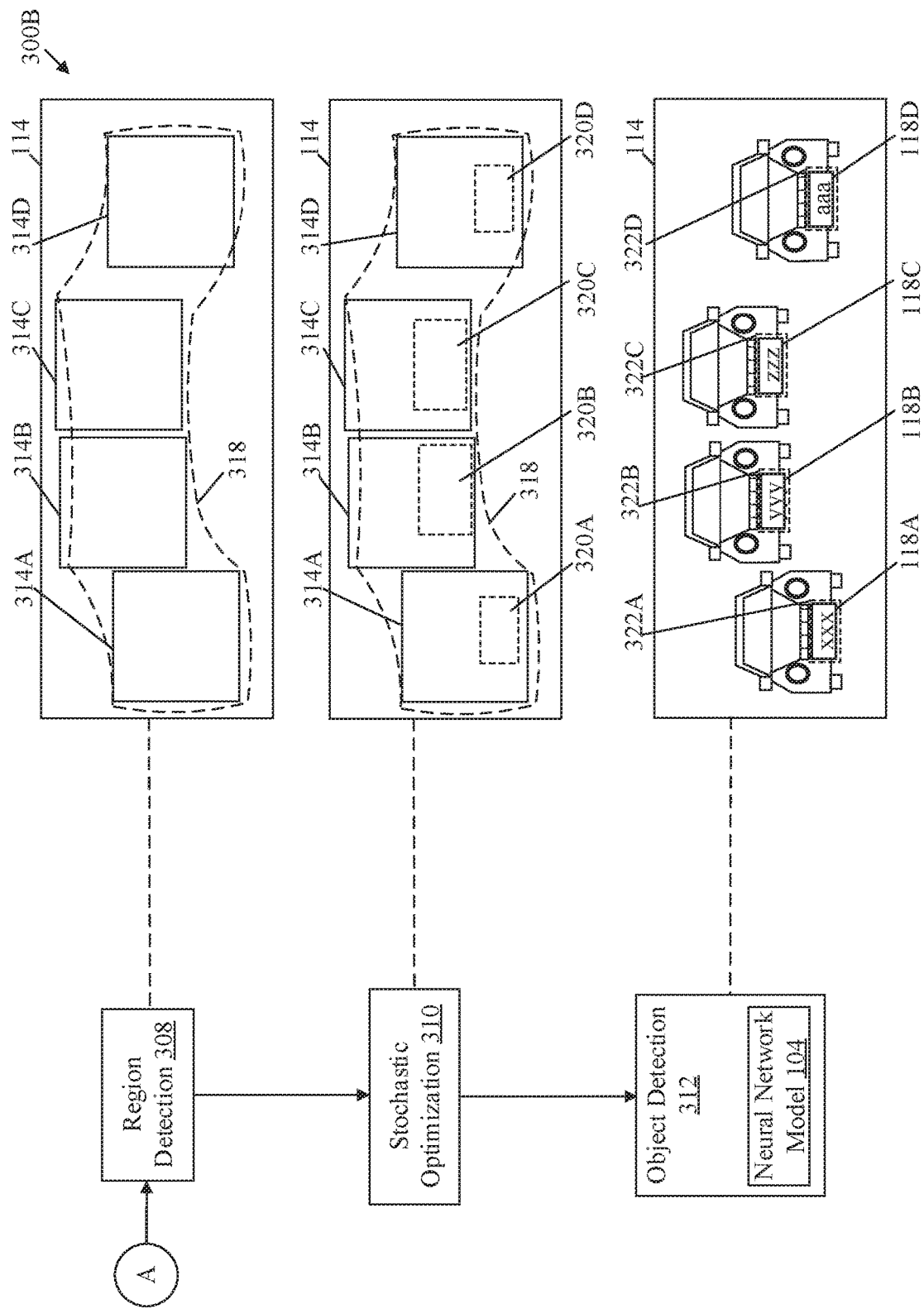

FIGS. 3A and 3B collectively, illustrate an exemplary scenario for detection of an object in an image based on stochastic optimization, in accordance with an embodiment of the disclosure. FIGS. 3A and 3B are explained in conjunction with elements from FIG. 1 and FIG. 2. With reference to FIGS. 3A and 3B, there are shown scenarios 300A and 300B (collectively a scenario 300) that depict a processing pipeline of the first image 114 executed by the electronic device 102 or the circuitry 202 using the neural network model 104.

With reference to FIG. 3A, at 302, an image-capture operation may be executed. In the image-capture operation, an image-capturing device (for example the image capturing device 106) may be controlled by the circuitry 202 of the electronic device 102 to capture the first image 114 in the field-of-view 112 of the image capturing device 106. In accordance with an embodiment, the first image 114 may be of a first size. For instance, the first image 114 may be a High-Definition (HD) image or a 4K resolution image (for example with 3840*2160 pixel-size or 4096*2160 pixel-size as the first size. The image capturing device 106 may be configured to transmit the first image 114 to the electronic device 102. In some embodiments, the electronic device 102 may control the image capturing device 106 to capture and transmit a sequence of images which may include first image 114. The electronic device 102 may be configured to regularly control the image capturing device 106 at a particular time interval (for example in every few seconds or minutes) to capture and provide the first image 114. The captured first image 114 may include the plurality of objects 116 (for example vehicles).

At 304, a bounding-box detection operation may be executed. In the bounding-box detection operation, the circuitry 202 of the electronic device 102 may be configured to apply the neural network model 104 on the captured first image 114 to detect one or more bounding boxes in the first image 114. Each of the one or more detected bounding boxes may include one or more of the plurality of objects 116. For example, as shown in FIG. 3A, the plurality of objects 116 may include four vehicles 116A-116D that may include respective vehicle license plates 118A-118D. Based on application of the neural network model 104 on the first image 114, the circuitry 202 may detect one or more bounding boxes that may include a first bounding box 314A, a second bounding box 314B, a third bounding box 314C, and a fourth bounding box 314D. Each of the four detected one or more bounding boxes 314A-314D may encompass an image of each of the respective vehicles 116A-116D. The neural network model 104 may be pre-trained to detect the bounding boxes around the plurality of objects 116 captured in the first image 114. Examples of the neural network model 104 used for the bounding-box detection operation may include, but are not limited to, an artificial neural network (ANN), a convolutional neural network (CNN), a CNN-recurrent neural network (CNN-RNN), Region-CNN (R-CNN), Fast R-CNN, Faster R-CNN, a Long Short Term Memory (LSTM) network based RNN, a combination of CNN and ANN, a combination of LSTM and ANN, a gated recurrent unit (GRU)-based RNN, a deep Bayesian neural network, a Generative Adversarial Network (GAN), a deep learning based object detection model, a feature-based object detection model, an image segmentation based object detection model, a blob analysis-based object detection model, a "you look only once" (YOLO) object detection model, or a single-shot multi-box detector (SSD) based object detection model.

At 306, a probability map determination operation may be executed. In the probability map determination operation, the circuitry 202 of the electronic device 102 may be configured to determine the probability map information for the first image 114, based on the one or more bounding boxes which may be detected based on the application of the neural network model 104 on the first image 114. The probability map information may indicate a probability value for each pixel of the first image 114 associated with the plurality of objects 116 in the first image 114. In some embodiments, the probability map information may indicate an absence or presence of a portion of an object from the plurality of objects 116 at each pixel in the first image 114. In some embodiments, the circuitry 202 may determine the probability map information for all the pixels included in the first image 114. In other embodiments, the circuitry 202 may determine the probability map information for the pixels included in the detected bounding boxes 314A-314D to save time or enhance a speed of the object detection.

In FIG. 3A, there is also shown exemplary pixel locations in the first image 114, such as, pixels P1 316A, P2 316B, P3 316C, P4 316D, P5 316E, P6 316F, and P7 316G. The probability map information determined for the first image 114 may include probability values indicative of an association of each pixel (including the pixels P1 316A to P7 316G) with the plurality of objects 116 in the first image 114. The probability values of pixels within the detected bounding box may be higher that the probability values of the rest of the pixels in the first image. For example, the probability values of the pixels P1 316A, P3 316C, P5 316E, and P7 316G that lie within the detected bounding boxes 314A-314D, respectively, may be higher than that of the pixels outside the detected bounding boxes, such as, the pixels P2 316B, P4 316D, and P6 316F. For example, the probability value for the pixel P6 316F (which lies outside the detected bounding boxes 314A-314D) may be 0.45 or less, and the probability value for the pixel P7 316G (which lies within the fourth bounding box 314D and may be associated with or include the fourth vehicle 116D as object) may be 0.75 or more. In case of vehicle license plates as objects, the probability values for pixels, associated with or which may include portions of the vehicle license plates, may be higher than the probability values for the rest of the pixels in the first image 114. Since the license plates for vehicles are typically located at a lower middle end of the vehicle (or at a lower portion of the bounding box), as shown in FIG. 3A, the pixel P1 316A that lie towards lower middle end of the first bounding boxes 314A, may have higher probability value, for example as, 0.85 or more. In some embodiments, the probability map information may be in matrix form which may indicate the determined probability value for each pixel, where the probability value may indicate that the corresponding pixel is associated with the detected bounding boxes 314A-314D or may include information of the plurality of objects 116 included in the first image 114. In some embodiments, the probability map information may form a heat map based on the determined probability values for each pixel in the first image 114.

In accordance with an embodiment, one or more imaging parameters may be associated with the image capturing device 106. Examples of the one or more imaging parameters may include, but are not limited to, a position parameter associated with the image capturing device 106, an orientation parameter associated with the image capturing device 106, a zooming parameter associated with the image capturing device 106, a type of an image sensor associated with the image capturing device 106, a pixel size associated with the image sensor of the image capturing device 106, a lens type associated with the image capturing device 106, a focal length associated with the image capturing device 106 to capture the first image 114, or a geo-location of the image capturing device 106. In some embodiments, the circuitry 202 may be configured to detect a change in an imaging parameter associated with the image capturing device 106. In case of detected change in the one of the imaging parameters, the circuitry 202 may be further configured to again determine or update the probability map information based on the detected change in the imaging parameter. In accordance with an embodiment, the circuitry 202 may use a Kalman Filter to determine or update the probability map information. The circuitry 202 may again determine or update the probability map information since the change in the imaging parameter (for example change in zooming, orientation, linear position, focal length, or GPS location) of the image capturing device 106 may change the plurality of objects 116 or the detected bounding boxes 314A-314D in the first image 114 captured again based on the changed imaging parameter. The changed imaging parameter may change a number, size, or position of the plurality of objects 116 in the first image 114 captured again by the image capturing device 106 with the change in one or more imaging parameters.

In accordance with an embodiment, the circuitry 202 may again determine or update the probability map information based on change of a relative pixel positioning, pixel size, or resolution, associated with the plurality of objects 116 in images captured by the image capturing device 106. For example, the probability map information may be updated based on a change in an object's position or pixel size in a current image as compared to the object's position or size in a previously captured image. Further, the relative position or pixel size of the plurality of objects 116 may vary with change in the geo-location or physical position of the image capturing device 106 and/or the electronic device 102. For example, an image captured on a street or a city may have different position (or pixel size) of vehicles/license plates (as object) as compared to another image captured on a highway. Further, a position, an orientation, or a zooming parameter (e.g., an optical-zoom level) of the image capturing device 106 may also influence the relative pixel position, pixel size or number of the plurality of objects 116 in the captured first image 114. In addition, hardware image-capturing parameters of the image capturing device 106 may influence pixel position, pixel size or pixel resolution associated with the plurality of objects 116 in the first image 114. Examples of the hardware image-capturing parameters of the image capturing device 106 may include, but are not limited to, a type of an image sensor, a lens type, or a focal length, associated with the image capturing device 106 to capture the first image 114.

In some embodiments, the circuitry 202 may detect a change in ambient conditions (for example light or brightness) around the image capturing device 106 and again determine or update the probability map information based on the detected ambient conditions. For example, a change in lighting/brightness around the image capturing device 106 may change brightness information of the pixels associated with the plurality of objects 116 captured in the first image 114. The change in the brightness information may further affect the detection of the plurality of objects 116 from the first image 114. For example, during day time (or during sunny day), the plurality of objects 116 captured in the first image 114 may be brighter, than the plurality of objects 116 captured during evening time (or during rainy day). Thus, the disclosed electronic device 102 may be configured to again determine or update the probability map information based on detected change in the ambient conditions (as the imaging parameters) around the image capturing device 106.

In some embodiments, the circuitry 202 may be configured to determine the probability map information at a defined time interval. For instance, the circuitry 202 may be configured to control the image capturing device 106 to capture a second image (not shown in FIG. 1) at the defined time interval after the capture of the first image 114. Thereafter, the circuitry 202 may be configured to determine the probability map information for the captured second image, as described at step 306 of FIG. 3A. Thus, the disclosed electronic device 102 may dynamically update or determine the probability map information of the first image 114 based on the change in the first image 114 or a real-time change in one of the imaging parameters associated with the image capturing device 106. This dynamic adaptability to the change in the imaging parameter (or imaging conditions) of the image capturing device 106 may further enhance the accuracy of the object detection irrespective of any change in the imaging condition (for example zooming, different geo-locations, two-dimensional or three-dimensional movement, ambient lighting, or image sensor type/pixel size) of the image capturing device 106.

With reference to FIG. 3B, at 308, a region detection operation is executed. In the region detection operation, the circuitry 202 of the electronic device 102 may be further configured to detect a region 318 that may correspond to the plurality of objects 116 in the first image 114 based on the determined probability map information. In some embodiments, the circuitry 202 may consider a predefined probability threshold for the detection of the region 318 based on the determined probability map information, for each pixel in the first image 114. For example, all the pixels may be considered in the region 318 for which the determined probability value in the probability map information exceeds predefined probability threshold (for example 0.7). The detected region 318 in the first image 114 may indicate a maximum coverage or inclusion of the plurality of objects 116 of the first image 114, as shown in FIG. 3B. In another embodiment, to detect the region 318, the circuitry 202 may apply different image processing techniques such as, but not limited to, a region-growing method, an edge detection technique, an image segmentation technique, a boundary detection technique, a fuzzy rule-based thresholding, a maximum entropy method, a balanced histogram thresholding, a hybrid thresholding, Otsu's method (maximum variance method), or k-means clustering. In some embodiments, the region 318 may encompass the one or more detected bounding boxes 314A-314D or include at least a portion of each of the one or more detected bounding boxes 314A-314D as shown in FIG. 3B.

At 310, a stochastic optimization operation is executed. In the stochastic optimization operation, the circuitry 202 of the electronic device 102 may be configured to determine a first set of sub-images 320A-320D from the detected region 318 based on application of a stochastic optimization function on the determined probability map information. Examples of the stochastic optimization function may include, but are not limited to, a cost function, a direct search function, a simultaneous perturbation function, a Hill climbing function, a random search function, a Tabu search function, a Particle Swarm Optimization (PSO) function, an Ant Colony Optimization function, a simulated annealing function, or a genetic function. In an embodiment, based on the application of the stochastic optimization function on the determined probability map information, the circuitry 202 may be configured to determine a number of sub-images of the first set of sub-images 320A-320D. Further, the circuitry 202 may also be configured to determine a second size of each of the first set of sub-images 320A-320D and a position of each of the first set of sub-images 320A-320D in the first image 114 based on the application of the stochastic optimization function on the determined probability map information.

The first set of sub-images 320A-320D determined from the region 318 may include a first sub-image 320A, a second sub-image 320B, a third sub-image 320C, and a fourth sub-image 320D within the first bounding box 314A, the second bounding box 314B, the third bounding box 314C, and the fourth bounding box 314D, respectively. In an embodiment, the second size of each of the first set of sub-images 320A-320D (i.e. to be cropped images) may be lesser than the first size of the first image 114 (i.e. HD image or 4K image). For instance, the first image 114 may be of 4K resolution with a pixel size of 3840*2160 or 4096*2160, and the first sub-image 320A and the fourth sub-image 320D may be of pixel size of 128*128, while the second sub-image 320B and the third sub-image 320C may be of pixel size of 256*256. In some embodiments, the pixel size of one or more of the first set of sub-images 320A-320D may be, for example, 512*512. The reduced pixel size of the first set of sub-images 320A-320D (to be cropped) in comparison to pixel size of the first image 114 (i.e. originally captured) may further reduce complexity or enhance efficiency of the object detection by the disclosed electronic device 102. In accordance with an embodiment, the first set of sub-images 320A-320D of the plurality of objects 116 may include images of the vehicle license plates (such as the first vehicle license plate 118A, the second vehicle license plate 118B). In accordance with an embodiment, the circuitry 202 may be configured to again determine the first set of sub-images 320A-320D from the detected region 318 based on the detected change in the one or more imaging parameters (e.g. zooming, position, geo-location, ambient condition, image sensor) associated with the image capturing device 106.

At 312, an object detection operation is executed. In the object detection operation, the circuitry 202 of the electronic device 102 may be configured to detect the one or more objects (e.g., the one or more vehicle license plates 118A-118D) in the first image 114. To detect the one or more objects, the circuitry 202 may be configured to select a second set of sub-images from the first set of sub-images 320A-320D. The circuitry 202 may be configured to crop the detected first set of sub-images 320A-320D from the first image 114 and further select the second set of sub-images from the cropped first set of sub-images 320A-320D. The circuitry 202 may be further configured to apply the neural network model 104 on the selected second set of sub-images to detect the one or more objects (e.g., the one or more vehicle license plates 118A-118D) from the first image 114. Examples of the neural network model 104 used for the object detection operation may include, but are not limited to, an artificial neural network (ANN), a convolutional neural network (CNN), a CNN-recurrent neural network (CNN-RNN), Region-CNN (R-CNN), Fast R-CNN, Faster R-CNN, a Long Short Term Memory (LSTM) network based RNN, a combination of CNN and ANN, a combination of LSTM and ANN, a gated recurrent unit (GRU)-based RNN, a deep Bayesian neural network, a Generative Adversarial Network (GAN), a deep learning based object detection model, a feature-based object detection model, an image segmentation based object detection model, a blob analysis-based object detection model, a "you look only once" (YOLO) object detection model, or a single-shot multi-box detector (SSD) based object detection model.

In an embodiment, the circuitry 202 may select the second set of sub-images from the first set of sub-images 320A-320D based on a batching criteria associated with the neural network model 104. In an embodiment, the trained neural network model 104 may be fed with one or more batches of the second set of sub-images for further object detection. In some embodiments, the number of second set of sub-images in each of the batches may be equal, for example, a batch-size of 4 sub-images, 5-sub-images, or 16 sub-images. In some embodiment, the circuitry 202 may be configured to determine the batch size based on the number of the first set of sub-images 320A-320D or the number of bounding boxes detected in the first image 114. In some embodiments, the batch size may be predefined. In another embodiment, a pixel size of each sub-image (i.e. in the first set of sub-images 320A-320D) selected in one batch may be same. For example, the first sub-image 320A and the fourth sub-image 320D (i.e. each of a pixel size 128*128) may be selected in a first batch of sub-images that may correspond to the second set of sub-images for a first iteration of the object detection operation. Similarly, the second sub-image 320B and the third sub-image 320C (i.e. each of a pixel size 256*256) may be selected in a second batch of sub-images that may correspond to the second set of sub-images for a second iteration of the object detection operation. In another embodiment, the circuitry 202 may form batches of the second set of sub-images based on an order of detection of the bounding boxes 314A-314D or the first set of sub-images 320A-320D. For example, the first sub-image 320A and the second sub-image 320B may form the first batch and the third sub-image 320C and the fourth sub-image 320D may form the second batch of the second set of sub-images.

In accordance with an embodiment, the circuitry 202 may be configured to feed or input a set of batches (one at a time) of the selected second set of sub-images to the neural network model 104 for detection of the one or more objects (e.g., the one or more vehicle license plates 118A-118D). For example, the first batch of the second sub-images may be fed to the neural network model 104 for detection of the first vehicle license plate 118A and the fourth vehicle license plate 118D. The circuitry 202 may further detect a first license plate portion 322A for the first vehicle license plate 118A and a fourth license plate portion 322D for the fourth vehicle license plate 118D in the first image 114, as shown in FIG. 3B, based on the application of the trained neural network model 104 on the first batch of the second set of sub-images. Similarly, for the second iteration of object detection operation, the circuitry 202 may feed the second batch of second sub-images to the neural network model 104 for detection of the second vehicle license plate 118B and the third vehicle license plate 118C. In such case, the circuitry 202 may detect a second license plate portion 322B for the second vehicle license plate 118B and a third license plate portion 322C for the third vehicle license plate 118C in the first image 114 based on the application of the trained neural network model 104 on the second batch of the second set of sub-images. Thus, the circuitry 202 may detect different vehicle license plates portions 322A-322D (i.e. which may include the corresponding vehicle license plates 118A-118D) in the first image 114 based on the trained neural network model 104 applied on the second set of sub-images (i.e. selected in batches from the first set of sub-images 320A-320D). The application of the second set of sub-images (i.e. with reduced pixel size as compared to actual first image 114) to the neural network model 104 may reduce the complexity (or time consumption) of the neural network model 104 to detect the objects (i.e. license plates) present in the first image 114 captured originally. Further, the second set of sub-images with same pixel characteristics (like pixel size, 256*256, or 512*512) selected in one batch may further reduce the processing complexity of the neural network model 104 to detect the objects (i.e. for example vehicle license plates), since the neural network model 104 may process all input second set of sub-images of equal pixel size in a single batch. Since, the neural network model 104 of the disclosed electronic device 102 do not directly process the original first image 114 (which may be captured with different pixel characteristics at each instance), the selection of the second sub-images in batches may reduce the processing complexity and enhance efficiency of the neural network model 104 for the object detection. Therefore, the disclosed electronic device 102 may initially control the neural network model 104 to detect the one or more bounding boxes from the original first image 114 (i.e. HD or 4K image) and further control the same neural network model 104 (or different neural network model) to detect the one or more objects (i.e. license plates) from or based on the second set of sub-images (i.e. reduced-size cropped images selected in batches from the detected one or more bounding boxes based on the probability map information and the applied stochastic optimization function). The disclosed electronic device 102 may not re-size or re-scale (i.e. reduce size) the originally captured first image 114, however select the second set of sub-images, to further enhance or maintain the accuracy of the object detection.

In one or more embodiments, the plurality of objects 116 may correspond to one of an animate object or an inanimate object. For example, the plurality of objects 116 may correspond to one or more articles processed on an assembly-line in an industry. In another example, the plurality of objects 116 may correspond to one or more objects (like human faces) detected by a surveillance system. In yet another example, the plurality of objects 116 may correspond to one or more obstacles detected by a self-driving or autonomous vehicle, and the like.

Although the exemplary scenario 300 is illustrated as discrete operations, such as 302, 304, 306, 308, 310, and 312, the disclosure is not so limited. Accordingly, in certain embodiments, such discrete operations may be further divided into additional operations, combined into fewer operations, or eliminated, depending on the particular implementation without detracting from the essence of the disclosed embodiments.

Figure 4:
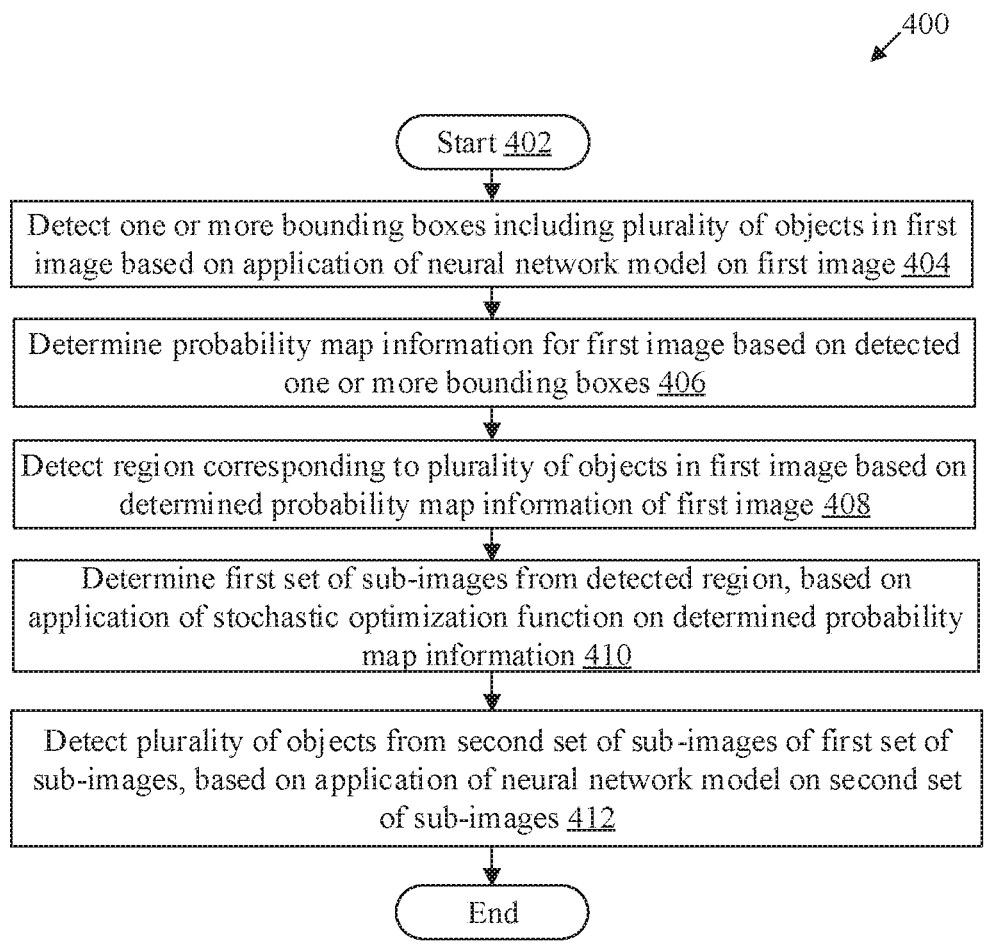
FIG. 4 is a diagram which depicts a flowchart that illustrates an exemplary method for detection of an object in an image based on stochastic optimization, in accordance with an embodiment of the disclosure.

FIG. 4 is a diagram which depicts a flowchart that illustrates an exemplary method for detection of an object in an image based on stochastic optimization, in accordance with an embodiment of the disclosure. With reference to FIG. 4, there is shown a flowchart 400. The flow chart is described in conjunction with FIGS. 1, 2, 3A, and 3B. The exemplary method of the flowchart 400 may be executed by the electronic device 102 or the circuitry 202. The method may start at 402 and proceed to 404.

At 404, the one or more bounding boxes 314A-314D, which may include the plurality of objects 116, may be detected in the first image 114 based on the application of the neural network model 104 on the first image 114. In one or more embodiments, the circuitry 202 of the electronic device 102 may be configured to detect the one or more bounding boxes 314A-314D in the first image 114 based on application of the trained neural network model 104 on the first image 114. In an embodiment, the one or more bounding boxes 314A-314D may include the plurality of objects 116. The detection of the one or more bounding boxes 314A-314D is described, for example, in FIG. 3A.

At 406, the probability map information may be determined for the first image 114 based on the detected one or more bounding boxes 314A-314D. In one or more embodiments, the circuitry 202 may be configured to determine the probability map information for the first image 114 based on the detected one or more bounding boxes 314A-314D which may be detected based on the application of the neural network model 104 on the first image 114. The probability map information may indicate a probability value for association of each pixel of the first image 114 with a portion of one of the plurality of objects 116 in the first image 114. In some embodiments, the probability map information may indicate an absence or presence of the portion of an object from the plurality of objects 116 at each pixel in the first image 114. The determination of the probability map information for the first image 114 is described, for example, in FIG. 3A.

At 408, the region 318 corresponding to the plurality of objects 116 in the first image 114 may be detected in the first image 114 based on the determined probability map information. In one or more embodiments, the circuitry 202 may be configured to detect the region 318 corresponding to the plurality of objects 116 in the first image 114 based on the probability map information determined for the first image 114. In an embodiment, the region 318 corresponding to the plurality of objects 116 may encompass the one or more bounding boxes 314A-314D or include at least a portion of each of the one or more bounding boxes 314A-314D of the plurality of objects 116. The detection of the region 318 corresponding to the plurality of objects 116 in the first image 114 is described, for example, in FIG. 3B.

At 410, the first set of sub-images 320A-320D may be determined from the detected region 318 based on application of a stochastic optimization function on the determined probability map information. In one or more embodiments, the circuitry 202 may be configured to determine the first set of sub-images 320A-320D from the detected region 318 based on the application of the stochastic optimization function on the determined probability map information for the first image 114. Examples of the stochastic optimization function may include, but are not limited to, a cost function, a direct search function, a simultaneous perturbation function, a Hill climbing function, a random search function, a Tabu search function, a Particle Swarm Optimization (PSO) function, an Ant Colony Optimization function, a simulated annealing function, or a genetic function. In an embodiment, a second size of each of the first set of sub-images 320A-320D may be lesser than a first size of the first image 114. In some embodiments, the circuitry 202 may determine a number of sub-images of the first set of sub-images 320A-320D, the second size of each of the first set of sub-images 320A-320D, or a position of each of the first set of sub-images 320A-320D in the first image 114, based on application of the stochastic optimization function on the probability map information. The determination of the first set of sub-images is described, for example, in FIG. 3B.

At 412, the plurality of objects 116 may be detected from the second set of sub-images of the first set of sub-images 320A-320D based on the application of the neural network model 104 on the second set of sub-images. In one or more embodiments, the circuitry 202 may be configured to detect the plurality of objects 116 from the second set of sub-images (i.e. selected in batches from the first set of sub-images 320A-320D) based on application of the neural network model 104 on the second set of sub-images. The detection of the plurality of objects 116 (e.g., the one or more vehicle license plates 118 from the second set of sub-images is described, for example, in FIG. 3B. The control may pass to end.

Various embodiments of the disclosure may provide a non-transitory computer readable medium and/or storage medium, and/or a non-transitory machine readable medium and/or storage medium having stored thereon, a machine code and/or a set of instructions executable by a machine, such as an electronic device, and/or a computer. The set of instructions in the electronic device may cause the machine and/or computer to perform the operations that comprise determination of probability map information for a first image of a first size, based on application of a neural network model on the first image. The neural network model may be trained to detect one or more objects based on a plurality of images associated with the one or more objects. Further, the probability map information may indicate a probability value for each pixel associated with the one or more objects in the first image. The operations may further include detection of a region that may correspond to the one or more objects in the first image based on the determined probability map information of the first image. The operations may further include determination of a first set of sub-images from the detected region, based on application of a stochastic optimization function on the determined probability map information. A second size of each of the first set of sub-images may be lesser than the first size of the first image. Further, the operations may further include detection of the one or more objects from a second set of sub-images of the first set of sub-images, based on application of the neural network model on the second set of sub-images.

Exemplary aspects of the disclosure may include an electronic device (such as the electronic device 102 in FIG. 1) that may include circuitry (such as the circuitry 202 in FIG. 2) and a memory (such as the memory 206 in FIG. 2). The memory 206 of the electronic device 102 may be configured to store a neural network model (such as the neural network model 104 in FIG. 1). The neural network model 104 may be trained to detect one or more objects based on a plurality of images associated with the one or more objects. The circuitry 202 of the electronic device 102 may be configured to determine probability map information for a first image (such as the first image 114 in FIG. 1), based on application of the neural network model 104 on the first image 114. The probability map information may indicate a probability value for each pixel associated with the one or more objects in the first image 114. The circuitry 202 may be further configured to detect of a region that may correspond to the one or more objects in the first image 114 based on the determined probability map information of the first image 114. The circuitry 202 may be further configured to determine a first set of sub-images from the detected region, based on application of a stochastic optimization function on the determined probability map information. A second size of each of the first set of sub-images may be lesser than a first size of the first image 114. Further, the circuitry 202 may be configured to detect the one or more objects from a second set of sub-images of the first set of sub-images, based on application of the neural network model 104 on the second set of sub-images.

In an embodiment, the electronic device 102 may include an image capturing device (such as the image capturing device 106 in FIG. 1) that may be configured to capture the first image 114. The circuitry 202 may be further configured to detect a change in an imaging parameter associated with the image capturing device 106. Thereafter, the circuitry 202 may be configured to determine or update the probability map information based on the detected change in the imaging parameter. The imaging parameter associated with the image capturing device 106 may include, but is not limited to, a position parameter associated with the image capturing device 106, an orientation parameter associated with the image capturing device 106, a zooming parameter associated with the image capturing device 106, a type of an image sensor associated with the image capturing device 106, a pixel size associated with the image sensor of the image capturing device 106, a lens type associated with the image capturing device 106, a focal length associated with the image capturing device 106 to capture the first image 114, or a geo-location of the image capturing device 106.

In some embodiments, the circuitry 202 may be configured to control the image capturing device 106 to capture a second image at a defined time interval. Thereafter, the circuitry 202 may determine the probability map information for the captured second image. In accordance with an embodiment, the one or more objects may correspond to one or more license plates of one or more vehicles captured in the first image 114.

In accordance with an embodiment, the circuitry 202 may be configured to detect one or more bounding boxes in the first image 114 based on application of the neural network model 104 on the first image 114. Each of the one or more bounding boxes may include the one or more objects. In an embodiment, the circuitry 202 may be further configured to determine the probability map information for the first image 114 based on the detected one or more bounding boxes in the first image 114.

In accordance with an embodiment, the neural network model 104 may include, but is not limited to, an artificial neural network (ANN), a convolutional neural network (CNN), a CNN-recurrent neural network (CNN-RNN), Region-CNN (R-CNN), Fast R-CNN, Faster R-CNN, a Long Short Term Memory (LSTM) network based RNN, a combination of CNN and ANN, a combination of LSTM and ANN, a gated recurrent unit (GRU)-based RNN, a deep Bayesian neural network, a Generative Adversarial Network (GAN), a deep learning based object detection model, a feature-based object detection model, an image segmentation based object detection model, a blob analysis-based object detection model, a "you look only once" (YOLO) object detection model, or a single-shot multi-box detector (SSD) based object detection model. In accordance with an embodiment, the stochastic optimization function may include, but not limited to, a cost function, a direct search function, a simultaneous perturbation function, a Hill climbing function, a random search function, a Tabu search function, a Particle Swarm Optimization (PSO) function, an Ant Colony Optimization function, a simulated annealing function, or a genetic function.

In accordance with an embodiment, the circuitry 202 may be configured to determine at least one of a number of sub-images of the first set of sub-images, a size of each of the first set of sub-images, or a position of each of the first set of sub-images in the first image, based on the application of the stochastic optimization function on the determined probability map information.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. An electronic device, comprising:
   circuitry configured to:
   determine probability map information for a first image of a first size, based on application of a neural network model on the first image, wherein
   the neural network model is trained to detect at least one object based on a plurality of images associated with the at least one object,
   the determined probability map information indicates a probability value for each pixel of a plurality of pixels of the first image, and
   the plurality of pixels is associated with the at least one object in the first image;
   detect a region that corresponds to the at least one object in the first image based on the determined probability map information of the first image, wherein
   the detected region includes a set of pixels of the plurality of pixels, and
   the probability value for each pixel of the set of pixels exceeds a threshold value;
   determine a first set of sub-images from the detected region, based on application of a stochastic optimization function on the determined probability map information, wherein a second size of each of the first set of sub-images is less than the first size of the first image;
   determine at least one of a number of sub-images of the first set of sub-images, the second size of each of the first set of sub-images, or a position of each of the first set of sub-images in the first image, based on the application of the stochastic optimization function on the determined probability map information;
   crop the first set of sub-images from the first image based on the determined at least one of the number of sub-images of the first set of sub-images, the second size of each of the first set of sub-images, or the position of each of the first set of sub-images in the first image;
   select a second set of sub-images from the cropped first set of sub-images; and
   detect the at least one object from the second set of sub-images of the first set of sub-images, based on application of the neural network model on the second set of sub-images.

2. The electronic device according to claim 1, further comprising an image capturing device configured to capture the first image, wherein the circuitry is further configured to:
   detect a change in an imaging parameter associated with the image capturing device; and
   determine the probability map information based on the detected change in the imaging parameter.

3. The electronic device according to claim 2, wherein the imaging parameter associated with the image capturing device comprises at least one of a position parameter associated with the image capturing device, an orientation parameter associated with the image capturing device, a zooming parameter associated with the image capturing device, a type of an image sensor associated with the image capturing device, a pixel size associated with the image sensor of the image capturing device, a lens type associated with the image capturing device, a focal length associated with the image capturing device to capture the first image, or a geo-location of the image capturing device.

4. The electronic device according to claim 2, wherein the circuitry is further configured to:
   control the image capturing device to capture a second image at a specific time interval; and
   determine the probability map information for the captured second image.

5. The electronic device according to claim 1, wherein the at least one object corresponds to a license plate of at least one vehicle in the first image.

6. The electronic device according to claim 1, wherein the neural network model comprises one of an artificial neural network (ANN), a convolutional neural network (CNN), a CNN-recurrent neural network (CNN-RNN), Region-CNN (R-CNN), Fast R-CNN, Faster R-CNN, a Long Short Term Memory (LSTM) network based RNN, a combination of CNN and ANN, a combination of LSTM and ANN, a gated recurrent unit (GRU)-based RNN, a deep Bayesian neural network, a Generative Adversarial Network (GAN), a deep learning based object detection model, a feature-based object detection model, an image segmentation based object detection model, a blob analysis-based object detection model, a "you look only once" (YOLO) object detection model, or a single-shot multi-box detector (SSD) based object detection model.

7. The electronic device according to claim 1, wherein the stochastic optimization function comprises one of a cost function, a direct search function, a simultaneous perturbation function, a Hill climbing function, a random search function, a Tabu search function, a Particle Swarm Optimization (PSO) function, an Ant Colony Optimization function, a simulated annealing function, or a genetic function.

8. The electronic device according to claim 1, wherein the circuitry is further configured to:
   detect at least one bounding box in the first image based on the application of the neural network model on the first image, wherein the at least one bounding box includes the at least one object; and determine the probability map information for the first image of the first size based on the detected at least one bounding box in the first image.

9. A method, comprising:
in an electronic device:
determining probability map information for a first image of a first size, based on application of a neural network model on the first image, wherein
the neural network model is trained to detect at least one object based on a plurality of images associated with the at least one object,
the determined probability map information indicates a probability value for each pixel of a plurality of pixels of the first image, and
the plurality of pixels is associated with the at least one object in the first image;
detecting a region that corresponds to the at least one object in the first image based on the determined probability map information of the first image, wherein
the detected region includes a set of pixels of the plurality of pixels, and
the probability value for each pixel of the set of pixels exceeds a threshold value;
determining a first set of sub-images from the detected region, based on application of a stochastic optimization function on the determined probability map information, wherein a second size of each of the first set of sub-images is less than the first size of the first image;
determining at least one of a number of sub-images of the first set of sub-images, the second size of each of the first set of sub-images, or a position of each of the first set of sub-images in the first image, based on the application of the stochastic optimization function on the determined probability map information;
cropping the first set of sub-images from the first image based on the determined at least one of the number of sub-images of the first set of sub-images, the second size of each of the first set of sub-images, or the position of each of the first set of sub-images in the first image;
selecting a second set of sub-images from the cropped first set of sub-images; and
detecting the at least one object from the second set of sub-images of the first set of sub-images, based on application of the neural network model on the second set of sub-images.

10. The method according to claim 9, further comprising:
detecting a change in an imaging parameter associated with an image capturing device of the electronic device; and
determining the probability map information based on the detected change in the imaging parameter.

11. The method according to claim 10, wherein the imaging parameter associated with the image capturing device comprises at least one of a position parameter associated with the image capturing device, an orientation parameter associated with the image capturing device, a zooming parameter associated with the image capturing device, a type of an image sensor associated with the image capturing device, a pixel size associated with the image sensor of the image capturing device, a lens type associated with the image capturing device, a focal length associated with the image capturing device to capture the first image, or a geo-location of the image capturing device.

12. The method according to claim 10, further comprising:
controlling the image capturing device to capture a second image at a specific time interval; and
determining the probability map information for the captured second image.

13. The method according to claim 9, wherein the at least one object corresponds to a license plate of at least one vehicle in the first image.

14. The method according to claim 9, wherein the neural network model comprises one of an artificial neural network (ANN), a convolutional neural network (CNN), a CNN-recurrent neural network (CNN-RNN), Region-CNN (R-CNN), Fast R-CNN, Faster R-CNN, a Long Short Term Memory (LSTM) network based RNN, a combination of CNN and ANN, a combination of LSTM and ANN, a gated recurrent unit (GRU)-based RNN, a deep Bayesian neural network, a Generative Adversarial Network (GAN), a deep learning based object detection model, a feature-based object detection model, an image segmentation based object detection model, a blob analysis-based object detection model, a "you look only once" (YOLO) object detection model, or a single-shot multi-box detector (SSD) based object detection model.

15. The method according to claim 9, wherein the stochastic optimization function comprises one of a cost function, a direct search function, a simultaneous perturbation function, a Hill climbing function, a random search function, a Tabu search function, a Particle Swarm Optimization (PSO) function, an Ant Colony Optimization function, a simulated annealing function, or a genetic function.

16. The method according to claim 9, further comprising:
detecting at least one bounding box in the first image based on the application of the neural network model on the first image, wherein the at least one bounding box includes the at least one object; and
determining the probability map information for the first image of the first size based on the detected at least one bounding box in the first image.

17. A non-transitory computer-readable medium having stored thereon, computer-executable instructions that when executed by an electronic device, causes the electronic device to execute operations, the operations comprising:
determining probability map information for an image of a first size, based on application of a neural network model on the image, wherein
the neural network model is trained to detect at least one object based on a plurality of images associated with the at least one object,
the determined probability map information indicates a probability value for each pixel of a plurality of pixels of the image, and
the plurality of pixels is associated with the at least one object in the image;
detecting a region that corresponds to the at least one object in the image based on the determined probability map information of the image, wherein
the detected region includes a set of pixels of the plurality of pixels, and
the probability value for each pixel of the set of pixels exceeds a threshold value;
determining a first set of sub-images from the detected region, based on application of a stochastic optimization function on the determined probability map information, wherein a second size of each of the first set of sub-images is less than the first size of the image;

determining at least one of a number of sub-images of the first set of sub-images, the second size of each of the first set of sub-images, or a position of each of the first set of sub-images in the image, based on the application of the stochastic optimization function on the determined probability map information;

cropping the first set of sub-images from the image based on the determined at least one of the number of sub-images of the first set of sub-images, the second size of each of the first set of sub-images, or the position of each of the first set of sub-images in the image;

selecting a second set of sub-images from the cropped first set of sub-images; and detecting the at least one object from a second set of sub-images of the first set of sub-images, based on application of the neural network model on the second set of sub-images.

18. The non-transitory computer-readable medium according to claim 17, wherein the at least one object corresponds to a license plate of at least one vehicle in the image.

\* \* \* \* \*